United States Patent Office 3,419,982
Patented Jan. 7, 1969

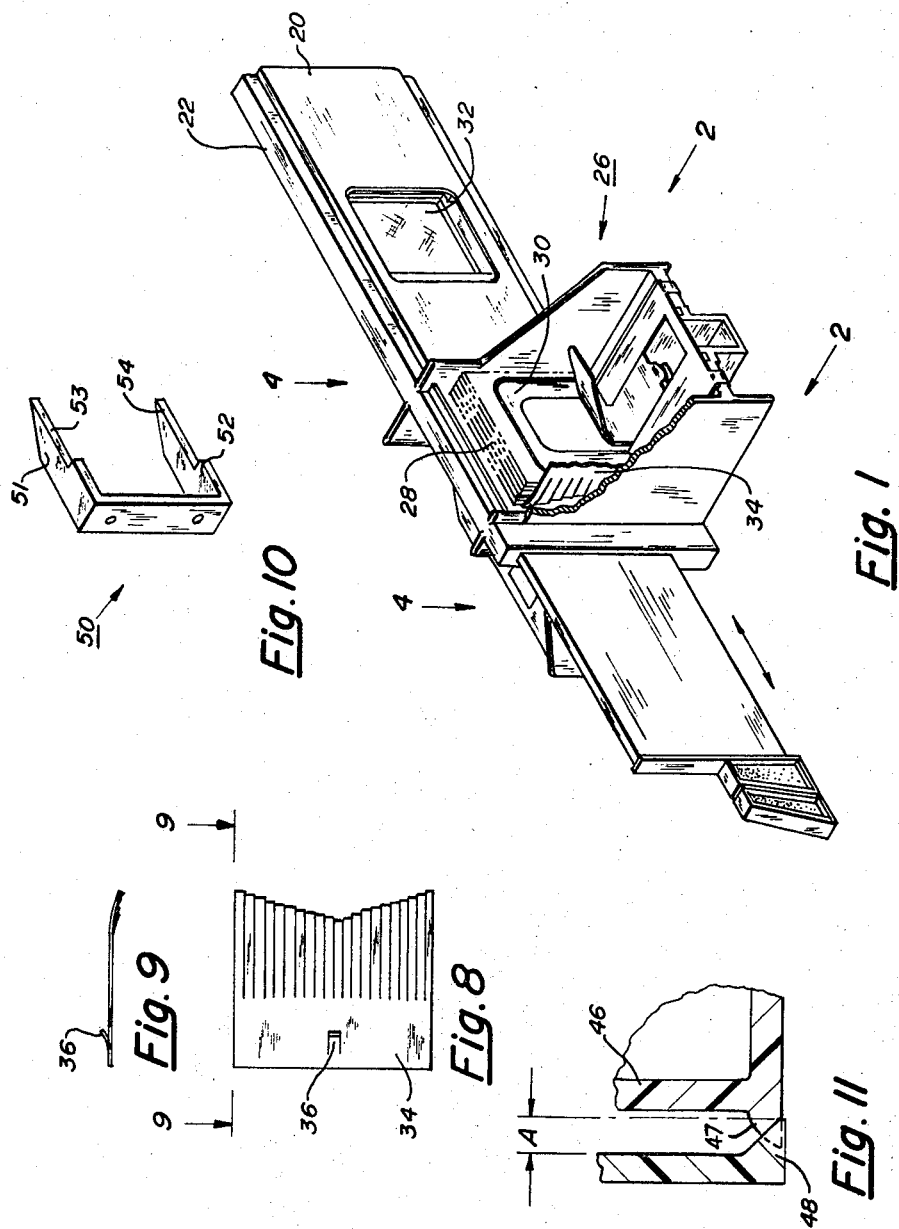

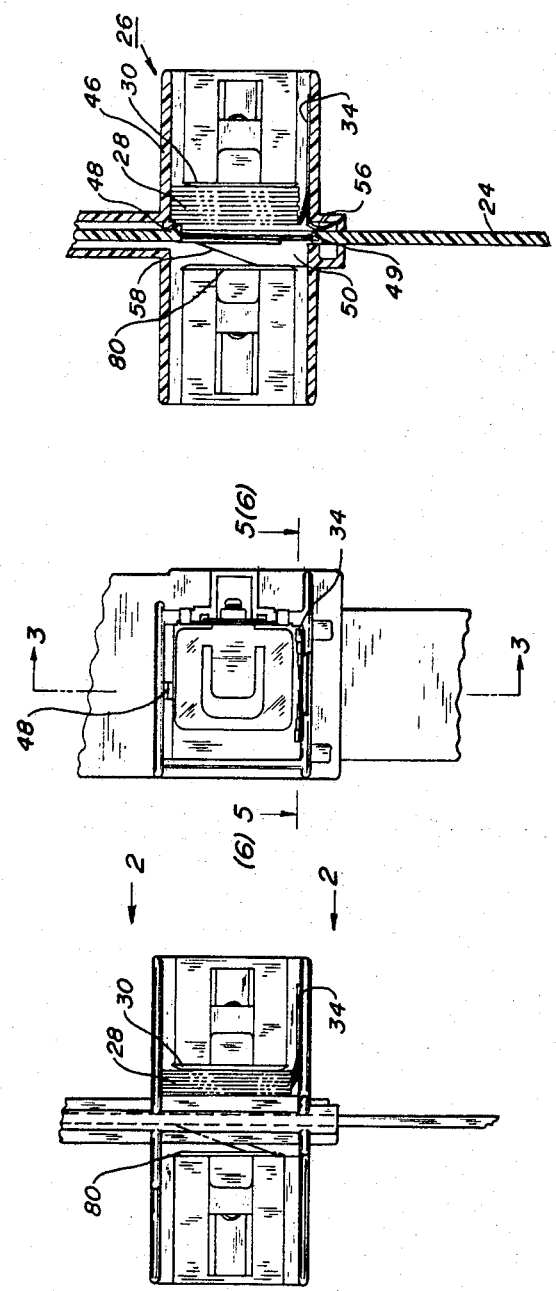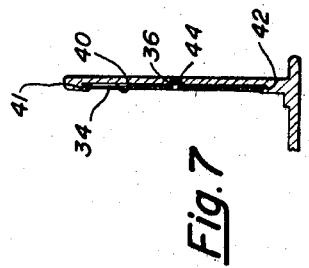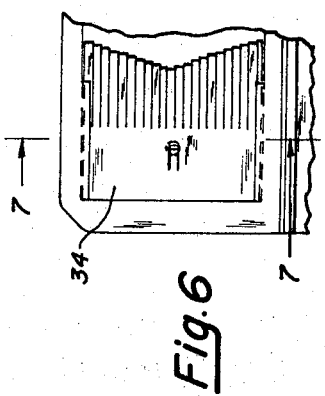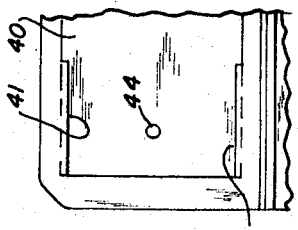

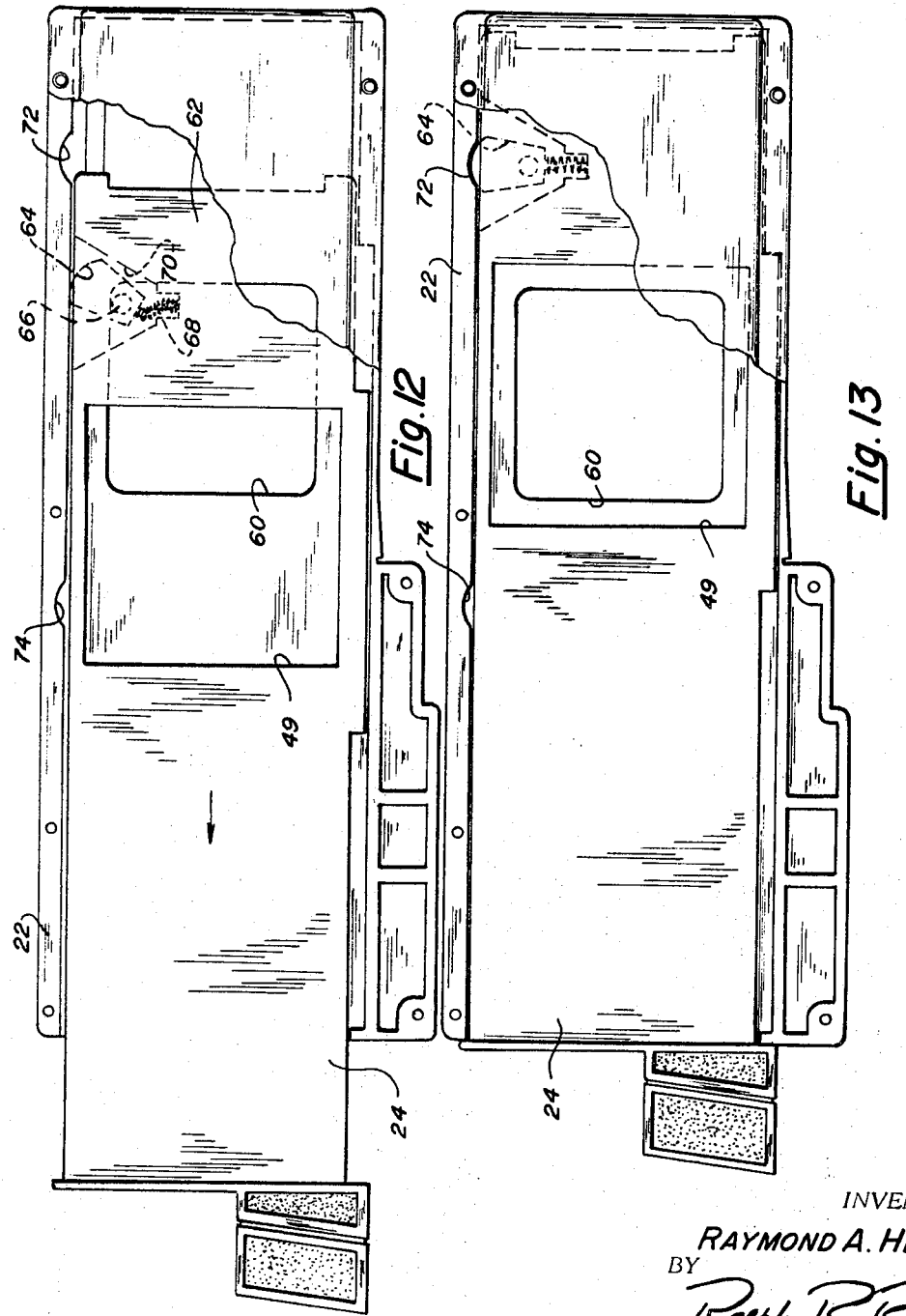

3,419,982
SLIDE CHANGER FOR MULTI-THICKNESS TRANSPARENCIES
Raymond A. Heisler, 657 Dakota Trail, Franklin Lakes, N.J. 07417
Filed Dec. 20, 1966, Ser. No. 603,305
U.S. Cl. 40—79    10 Claims
Int. Cl. G09f 11/30

ABSTRACT OF THE DISCLOSURE

A slide changer, of the operator powered type, is provided with a troughway receiving transparencies having every usual thickness of frame. One side of the troughway is provided with a comb-like spring engaging varying thicknesses of slide frames to provide a multi-width slide stop. As a pusher engages the opposite side of a slide it moves one slide from an array of slide and to the changer path. The pusher is provided with a toggle which requires the pusher to be pushed to its inner stroke limit before returning to the outer stroke limit and vice versa.

BACKGROUND OF THE INVENTION

Field of the invention

The slide changer of this invention is classified within the general field of optics and in particular to projecting apparatus and more particularly to the classification of view changing devices. This slide changer is preferably classified as a manual operating device. However, the improvement in the slide changer may readily be applied to changers mechanically reciprocated in devices considered as automatic or semi-automatic.

Description of the prior art

Slide changers of the type for manual operation are well known in the art and in particular recent projectors have used slide changing means such as that exemplified in U.S. Patent 3,077,817 issued to John W. Ehemann on Feb. 19, 1963. Changers of this type are adapted to receive a group of slides in side-by-side array, which slides are dropped into a troughway formed in the changer and by means of a spring biased pusher are urged into engagement with a stop whereupon the pusher is caused to enter the troughway to engage a slide and carry it to a viewing path. These changers are adapted for slides having generally uniform frame thicknesses.

In particular the new slide transparencies now in use include a wide variation in the thickness of the frame retaining the slides. This variation of frame thickness is due to several factors, among them being the so-called (jumbo) slides having a larger field of transparency and hence a narrower though thicker frame, which frame is usually plastic. Other frames may be a combination of cardboard and plastic while yet other frames for the transparency may be glass and metal. These frame thicknesses vary from a minimum of approximately thirty-five to forty thousandths of an inch total thickness to a maximum frame having a thickness of approximately one-eighth of an inch. It can be readily determined that two of the thin framed slides such as those having thicknesses of approximately thirty-five to forty thousandths of an inch combine to a total thickness that is less than one of the thickest framed slides. Three of the very thin slides of thirty-five thousandths of an inch framed thickness total a thickness less than the thickness of one of the glass protected slides having a thickness of one-eighth of an inch. The transparencies desired by the operator may be slides processed by several companies each having their own frame mounting and may include some of the so-called very expensive slides in glass. The operator, of course, desires a slide changer adapted to successively feed slides of any framed thickness one-at-a-time into the viewing path and return them to a discharge collecting point in a customary manner. Prior to this invention the wide variety in slide frame thicknesses are accommodated by using special slide trays requiring intermittent advancing mechanism in the projector. These trays are designed to accept one slide within fixed spacings, as for example, about one-quarter of an inch per slide. This, of course, makes the storage of the slides an expensive, space consuming proposition and requires the projector to have special tray advancing mechanism. It is an intent of this invention to provide a simple slide changer adapted to accept slides having varying frame thicknesses and to advance them one-at-a-time into viewing position.

SUMMARY OF THE INVENTION

The widespread popularity of color transparencies called slides and the projection apparatus therefore has made the ownership and use of slide projectors a common occurrence in the every-day family life. This is usually a hobby and so it is the usual intent of most families to keep the cost of slides and projectors at the very minimum in cost commensurate with satisfactory results. It is therefore an object of this invention to provide a slide changer adapted to accept a loose array of slides, which slides may, irrespective of the thicknesses of their frames, be fed singularly one-by-one into a viewing path and from this viewing path be returned to a storage channel from which they may be removed from the changer.

This invention therefore relates to slide changers and particularly to manually operable slide changers as used in projection apparatus of the type generally known as transparency projectors. More particularly this invention relates to slide changers of the type which are, as an integral self-contained unit, removable from the projection apparatus itself although this is not a particular criteria of the invention to be hereinafter more fully disclosed.

This invention even more particularly relates to a slide changer adapted to receive a loose array of slides having like outside dimensions but which may have frames of varying thicknesses. The outer like size of these frames are, as for an example, two inch by two inch and the thicknesses of the slide frames being, as for an example, thirty-five thousandths to one hundred and twenty-five thousandths of an inch in thickness.

Still more particularly this invention relates to a slide changer which may be usable in either an automatic, semi-automatic, or manually operated slide projector. The slides are placed in a troughway in this changer and by means of a biased pusher member are brought in the way of a transversely movable slide engaging and transfer apparatus, which slide engaging apparatus has a toggle means adapted to permit and require full tracking of the apparatus in one direction before the engaging apparatus is moved to its limit in the other direction. In the preferred embodiment to be hereinafter shown and described, a group of slides such as (for example, twenty or twenty-five may be dropped into a troughway on one side of the slide engaging apparatus and by means of a biased pusher member be brought in the way of a pair of stop extensions. The stopped and positioned slide is then moved from the troughway by the engaging apparatus as it engages slides one-at-a-time to advance the slide into a viewing path. After viewing, the slide is returned toward the troughway and into the way of a deflecting means and is guided to the troughway on the other side of the slide engaging apparatus.

The outer wall of the infeeding side of the troughway is provided with a spring comb having substantially contiguous tines whose ends are made of differing lengths. The tine ends are spaced so as to engage the frame edge of the inner slide and the next adjacent slides. The tine ends in contact with the slide is deflected by the slide being moved into the slide path so that only the slide that is urged into the infeeding path is brought into the way of the slide engaging means, which means has a toggle disposed to move in response to and prevent reciprocation of the slide engaging means except when the engaging means has been moved to its limits of operation.

There has been outlined rather broadly the most important features of the slide changer of this invention in order that the detailed description which follows may be better understood and in order that the present contribution to the art may be more fully appreciated. Those persons skilled in the art will appreciate that the conception on which the present disclosure is based may be utilized as the basis for designing other structures carrying out the several purposes of this invention.

There has been chosen a specific embodiment of the invention for the purposes of illustration and description and this embodiment is shown in the accompanying drawings which form a part of the specification wherein:

BRIEF DESCRIPTION OF THE DRAWINGS

FIG. 1 represents an isometric view of the slide changer with portions of the near troughway broken away to show the spring comb used as an engaging stop for one edge of each of the array of slides;

FIG. 2 represents a somewhat fragmentary view looking into the infeeding portion of troughway of the slide changer and looking in particular in the direction of the arrows 2—2 of FIGS. 1 and 4;

FIG. 3 represents a somewhat fragmentary sectional view taken on the line 3—3 of FIG. 2;

FIG. 4 represents a somewhat fragmentary plan view looking downwardly toward the slide changer and the troughway thereof and taken on the line 4—4 of FIG. 1;

FIG. 5 represents a somewhat fragmentary view taken on the line 5—5 of FIG. 2 and looking outwardly toward the interior wall of the troughway into which the spring comb may be mounted;

FIG. 6 is a fragmentary view as in FIG. 5 but with the spring comb mounted in a retaining guideway formed in the inner wall of the troughway;

FIG. 7 represents a sectional view taken on the line 7—7 of FIG. 6 and showing the manner of mounting the spring comb in the wall;

FIG. 8 represents a plan view showing the spring comb prior to mounting in the side wall and particularly the tine arrangement as it is adapted to engage the edge of the slide array;

FIG. 9 represents an edge view of the spring of FIG. 8 and looking in the direction of the arrows 9—9 of FIG. 8;

FIG. 10 represents an isometric view of a deflector member of the slide changer;

FIG. 11 represents an enlarged fragmentary view showing a portion of a transfer bar and inner troughway;

FIG. 12 represents a side view of the changer with a portion of the front member broken away to show the internal construction of the transfer bar with a toggle means limiting the transfer bar to complete reciprocations of movement; and FIG. 13 shows the changer of FIG. 12 also with a part of the front member broken away to show the internal arrangement of the changer with the transfer bar moved to the inward extent of movement.

DESCRIPTION OF THE PREFERRED EMBODIMENT

Referring now in particular to the drawings in which like numbers refer to like members throughout the several figures and in particular to FIG. 1 in which a frame includes a front member 20 and a rear member 22 with in which is reciprocated a transverse transfer bar 24. The front member 20 is formed with a troughway generally designated 26 in which slides or transparencies 28 are slidably contained. These slides are urged towards the transfer bar 24 by means of a spring biased pusher plate member 30. A viewing aperture 32 is provided in the rightward portion of the changer. To this aperture the slides are moved from the troughway 26 and conventionally the projection of the slide is made upon the placing of the slide in the illuminating path of the projector.

Referring next to FIGS. 2, 3, 4, 5, 6 and 7 there is shown in FIG. 3 the array of slides 28 which are a rather loose sliding fit in troughway 26. The pusher member 30 urges the slides inwardly or leftwardly and as the slides approach the transfer bar 24 the outer edges are engaged by a spring gate or comb 34 to be more fully described below. This spring gate is carried in the outer wall of the troughway 26 and the inner end of the spring is bowed inwardly to engage the edge of the frames of slides 28.

Referring to FIGS. 8 and 9 for the construction of spring 34 it is to be noted that the spring gate has its inward end which is the end adjacent the transfer bar formed with a series of tines substantially contiguous to each other. The tines are of differing lengths with the ends arranged in a line tapering inwardly centerwise. The tine ends are arranged in pairs so that each pair is in a common plane. As seen in FIG. 8, the tapering of the ends of the tines inwardly is slightly exaggerated to better illustrate the differential from one tine end to the next. Looking downwardly on the spring as in FIG. 9 it is to be seen that the ends of the tines are curved away from the general plane of the spring so that the ends extend outwardly into the path of the inward feeding slides as they are moved towards the transfer bar. In the general flat leftward plate portion of the spring (FIG. 8) there is formed a small lock means 36 in the form of a tab or lug. This lock is punched out of the general plate stock with the tab being in the form of an inwardly bent and deflectable tab whose use is to be more fully described hereinbelow.

Referring next to FIG. 5, it is to be noted that in the wall of the troughway as viewed in FIG. 5 there is provided a recess 40, which recess is preferably molded in as the part is formed. Forming upper and lower wall portions of the rearward part of the recess are dovetails 41 and 42, which dovetails are sized to slidably and snugly accept the width of the spring 34. Between the dovetails 41 and 42 there is an aperture 44 provided in the recess 40 in the wall, which hole is adapted to accept and engage deflectable lug 36. As seen in FIG. 6, the mounting of the spring 34 in the wall of the troughway is accomplished as the spring 34 is brought in the way of the dovetails 41 and 42 and as the spring is advanced towards the left end of the recess 40 the lug 42 engages the hole 44 and by its deflected bias moves outwardly to its normal formed position. As thus locked and as seen in FIG. 7 the lug upon entering in the hole prevents the spring from longitudinal movement and from being accidentally pushed rightwardly in the recess 40.

Referring once again to FIG. 3 and also to FIG. 11 wherein there is shown the relationship of the transfer bar and the walls of the troughways, in this embodiment the inner wall 46 of the troughway is provided with a short extension portion 47 which extends into the transfer bar chamber a short distance. This portion 47 approaches but does not touch the transfer bar. A notch relief or portion is made in the projection 47 to provide for the free passage therethrough of a projecting lug portion 48 extending rightwardly or outwardly from the main portion of the transfer bar 24. This lug 48 is sized to pass freely through the relief portion of the projection and as reduced to practice extends less than thirty-five thousandths of an inch which is usually the thinnest frame of the slides usually used in this changer. Dimension A (FIG. 11) which corresponds to and indicates the amount of extension of lug 48 is sized according to the thinnest frame of the slides likely to be used in the changer.

It is also to be noted that the face of the lug 48 and the return face of the transfer bar form a common plane against which the return edge of slide 28 is engaged. This face in its outer or rightward limit of movement extends a short distance into the troughway for a purpose to be hereinafter described. As the usually provided slide carrying opening 49 (FIG. 12) in the transfer bar comes in the way of the first or adjacent slide, the slide is urged into the opening until it engages the facing edge of deflector 50.

As seen in FIG. 10 this deflector has upper and lower portions 51 and 52 and in the face of these portions there are formed stepped or relief portions 53 and 54. The left or outward edge of the slide engages the unstepped portion of the portions 51 and 52 as the opening 49 in the transfer bar coincides with the slide outer configuration. The slide moves into opening 49 as urged by the pusher plate 30 and the lug 48 engages the right of inner edge of the first slide 28 to move the slide further left or outwardly into the transfer bar opening as seen in FIG. 3. As the slide is moved into the transfer bar opening by the lug the tine ends in the way of the moving slide edge are deflected out of the way and the slide moves leftwardly out of the troughway. The undeflected tine ends engage the next outwardly disposed slides.

A spring deflector 56 is mounted in a recess leftwardly of and adjacent the troughway and the tine ends of the spring 34. The deflector is curved to provide a ramp or cam to guide the slide completely into the transfer bar opening. The stepped portions 53 and 54 are provided so that as the frame of slide 28 is pushed into the transfer bar opening the slide does not rebound but aligns itself within the thickness of the transfer bar path which is slightly greater than the thickest frame of a slide likely to be projected.

Referring next to FIG. 12, there is seen transfer bar 24 with the opening 49 to the left of a conventional projection path opening 60 formed in the rear member 22. Carried on the rightward bar portion 62 of the transfer bar is a toggle brake lug 64 pivotally carried on a shaft 66 molded on the rear side of bar portion 62. A spring 68 (which as shown is a compression spring held on both ends by tabs alternatively may also be a flat spring) is carried in a pocket portion of relief 70. This spring is adapted to urge the lug 64 into a vertical position. The upper guide surface of member 22 has a rightward toggle lug turning relief 72 while a similar leftward relief 74 is also molded in the upper guide surface above the left portion of opening 49. These reliefs are so shaped that the lug 64 is able to swing into a vertical position when directly under either relief 72 or 74.

Referring finally to FIG. 13 wherein the transfer bar has been moved to its rightward or inner limit, the bar may now be moved outwardly or to its leftward limit. The lug 64 is vertically disposed in relief 72 and opening 49 is aligned with path opening 60. When a slide is carried in the opening 49 the inner frame of the slide aligns with and may coincide with the projection path opening 60.

It is apparent that the lug 64 must be tilted either to the right or left as the transfer bar is reciprocated and that urged by spring 68 toward a vertical position will jam if the bar is moved toward the direction of tilt of the lug.

USE AND OPERATION

The slide changer of this invention provides a troughway into which an array of slides may be dropped and by means of pusher 30 be urged toward the transfer bar 24. As the innermost slide engages the face of the bar it is gripped between the inner wall and the tines of spring 34. As the opening 49 of the bar coincides with the slide, the lug 48 engages the inner edge of the slide and the slide is moved outwardly a short distance leftwardly from the troughway. The tines in engagement with the slide are deflected out of the way of the outer edge of the slide and the slide is cammed into the opening 49 by spring deflector 56. The slide, no matter how thick, is now in the opening 49 and the adjacent slide is retained between the tines of the spring 34 and the opposite wall of the troughway.

In the moving of the slides in the transfer bar the bar is controlled as to its reciprocation by the counterflow inclination of toggle lug 64. In its leftward or outward movement the upper end of the toggle lug is inclined rightwardly and any attempt to a counterflow or rightward movement results in an immediate jam of the spring urged lug 64 against the undersurface of the upper guide surface of the member 22. When the transfer bar is moved to its extreme outward or rightward limit the lug 64 is free to swing in the arc relief 74 and the bar 24 may then be moved inwardly or rightwardly with the toggle lug as it leaves the relief 74 being swung to the left at about the angle shown oppositely in FIG. 12.

Leaning to the left the lug 64 will jam when the transfer bar is attempted to be moved counterflow or leftwardly of the prescribed flow. The transfer bar must be moved to its inward limit whence lug 64 swings upward into relief 72 before the transfer bar is able to be moved outwardly to the left.

The lug 64 insures that enagement and reception of the slide 28 into opening 49 of the transfer bar and the camming into opening 49 is complete before the transfer bar is moved inwardly. In like manner the lug insures that the slide is brought in alignment with the projection path opening 60 before it is reciprocated outwardly.

The deflector 50 has the projecting ends of each of the portions 51 and 52 tapered to provide camming surfaces 58 for the conventional engagement and deflection of the outgoing slides. The deflected slides enter the leftward or discharge troughway and are supported in aligned array by biased pusher 80.

Descriptive terms such as "up," "down," "in," "out," "right," "left" and similar terms are applicable to the preferred embodiment as shown and described in conjunction with the accompanying drawings. These terms are merely for the purpose of description and do not necessarily apply to a position in which the slide changer may be constructed or used.

The conception of the gate with its multiple engaging means adapted for slide frames of all thicknesses is not limited to the specific embodiment shown and described but departures therefrom may be made within the scope of the accompanying claims and without sacrificing its chief advantages and protection is sought to the broadest extent the prior art allows.

What is claimed is:

1. In a slide changer for use with a projector and like viewing apparatus, the changer having a frame with a troughway therethrough sized to slidably retain an array of slides which may have frames of varying thicknesses and like outside contours, the troughway having a pusher means for retaining the slides in an upright position and urging the slides toward a transversely disposed transfer bar reciprocably carried in the frame, the transfer bar having a slide carrying opening therein for receiving and transporting a slide and moving the slide from the troughway to a projection path opening and from this path return the slide to the other side of the transfer bar and the troughway, wherein the improvement comprises:

(a) a spring gate mounted in one wall of the troughway and having a multiplicity of tines of varying length, the tine ends disposed so as to engage the edge of a successive array of slides and urge them toward the opposite wall of the troughway;

(b) means on the transfer bar for engaging a portion of the inner frame edge of the slide, said means providing an engagement of a thickness no greater than the thinnest frame of the array of slides;

(c) means for carrying the slide a determined distance outwardly of the troughway and away from the viewing path opening and as the slide is moved outwardly the frame of the slide deflects those tines in engagement to move them from in the way of the slide, and (d) means for moving the slide into the slide carrying opening of the transfer bar as the slide is moved outwardly from the troughway.

2. In a slide changer as in claim 1 in which the means for engaging provided on the transfer bar is a lug extending outwardly from the main portion of the bar, the face of the lug lying substantially in the same plane as the outward face engaging portion of the slide carrying opening and in which the inner wall of the troughway is provided with an extension portion extending nearly to the path of the wall face of the transfer bar and a notch relief in the extension portion, the relief sized and positioned to permit the free passage therethrough of the lug.

3. In a slide changer as in claim 1 in which the end portions of the tines are bent so that when the spring is mounted in the troughway wall the bent end portions will extend into the troughway an amount sufficient to resiliently engage the edge of one slide.

4. In a slide changer as in claim 3 in which the outer wall is provided with a spring receiving recess and a receiving means adapted to engage and retain the spring in a fixed position in this recess.

5. In a slide changer as in claim 4 in which there is a spring deflector adjacent the troughway and having a cam surface disposed to deflect a slide into the slide carrying opening as the transfer bar is moved to its outer limit.

6. In a slide changer as in claim 4 in which the spring retaining means is a hole formed in the troughway side wall and the spring has a deflectable lug formed and spaced to engage the hole when the spring is moved to its gate position.

7. In a slide changer as in claim 1 in which the transfer bar is provided with a toggle lug pivotally carried thereon and having its outer portion adapted to engage and be inclined to the under surface of a guideway; a biasing means adapted to engage the toggle lug and urge the lug toward a position vertical to the path of the transfer bar, and an arc relief formed in the guideway at both the inner and outer limits of movement of the toggle lug, each relief being formed so as to allow the lug to move to a vertical position and to be inclined counterflow to any reverse movement of the transfer bar in its movement intermediate the full inward or outward limit of the transfer bar.

8. In a slide changer as in claim 7 in which the biasing means engaging the toggle lug is a spring carried between the transfer bar and the end of the lug opposite the outer portion of the lug.

9. In a slide changer as in claim 8 in which the toggle lug is carried in the upper portion of the transfer bar and the arc reliefs are in the undersurface of the upper transfer bar guide surface of the frame.

10. In a slide changer as in claim 7 in which the means for engaging provided on the transfer bar is a lug extending outwardly from the main portion of the bar, the face of the lug lying in the same plane as the outward face engaging portion of the slide carrying opening; and in which the inner wall of the troughway is provided with an extension portion extending nearly to the path of the transfer bar and a notch relief in the extension portion, the relief sized and positioned to permit the free passage therethrough of the transfer bar lug, and in which there is a spring deflector adjacent the troughway and having a cam surface disposed to deflect a slide into the slide carrying opening as the transfer bar is moved to its outer limit.

References Cited

UNITED STATES PATENTS

| 2,522,760 | 9/1950 | Lowber et al. | 88—28 |
| 2,525,564 | 10/1950 | Simmons | 88—28 |
| 2,583,442 | 1/1952 | Parlini et al. | 88—28 |
| 3,077,817 | 2/1963 | Ehemann | 40—79 XR |
| 3,238,653 | 3/1966 | Wiklund | 40—79 |
| 3,273,454 | 9/1966 | Bast | 40—79 XR |

FOREIGN PATENTS

| 1,097,168 | 1/1961 | Germany. |
| 161,181 | 11/1957 | Sweden. |

NORTON ANSHER, Primary Examiner.

R. P. GREINER, Assistant Examiner.

U.S. Cl. X.R.

88—28